(12) United States Patent
Chen (10) Patent No.: US 7,140,629 B2
(45) Date of Patent: Nov. 28, 2006

(54) FOLDABLE BICYCLE

(75) Inventor: Min-Chang Chen, Taichung Hsien (TW)

(73) Assignee: Giant Manufacturing Co., Ltd., Taichung Hsien (TW)

(*) Notice: Subject to any disclaimer, the term of this patent is extended or adjusted under 35 U.S.C. 154(b) by 0 days.

(21) Appl. No.: 10/945,099

(22) Filed: Sep. 21, 2004

(65) Prior Publication Data

US 2006/0061060 A1 Mar. 23, 2006

(51) Int. Cl.
*B62K 15/00* (2006.01)
*B62B 7/06* (2006.01)

(52) U.S. Cl. .................. 280/287; 180/208; 280/639
(58) Field of Classification Search ........... 280/287, 280/278, 87.05, 401, 646, 639; 180/208
See application file for complete search history.

(56) References Cited

U.S. PATENT DOCUMENTS

| | | | | |
|---|---|---|---|---|
| 3,374,009 A | * | 3/1968 | Andre | 280/287 |
| 4,067,589 A | * | 1/1978 | Hon | 280/278 |
| 4,202,561 A | * | 5/1980 | Yonkers | 280/278 |
| 4,895,386 A | * | 1/1990 | Hellestam et al. | 280/287 |
| 5,052,706 A | * | 10/1991 | Tsai et al. | 280/287 |
| 5,069,468 A | * | 12/1991 | Tsai et al. | 280/278 |
| 2005/0062256 A1 | * | 3/2005 | Chen | 280/287 |

FOREIGN PATENT DOCUMENTS

GB 2103553 A * 2/1983

* cited by examiner

*Primary Examiner*—Lesley D. Morris
*Assistant Examiner*—Daniel Yeagley
(74) *Attorney, Agent, or Firm*—Harness, Dickey & Pierce, P.L.C.

(57) ABSTRACT

A foldable bicycle has a frame unit and a positioning unit. The frame unit includes a front wheel unit disposed on a front frame rod, a rear wheel unit disposed on a rear frame rod and aligned with the front wheel unit along a longitudinal direction of the bicycle, and a horizontal pivot pin interconnecting the front and rear frame rods rotatably such that the pivot pin and rotating axes of the front and rear wheel units forming generally an isosceles triangle. The positioning unit positions the rear frame rod behind the front frame rod, and is operable to allow for rotation of the front and rear frame rods about the pivot pin so as to dispose the bicycle at a folded position, where the front and rear wheel units are aligned with each other along a transverse direction of the bicycle.

7 Claims, 15 Drawing Sheets

FOLDABLE BICYCLE

BACKGROUND OF THE INVENTION

1. Field of the Invention

This invention relates to a bicycle, and more particularly to a foldable bicycle.

2. Description of the Related Art

Figure 1:
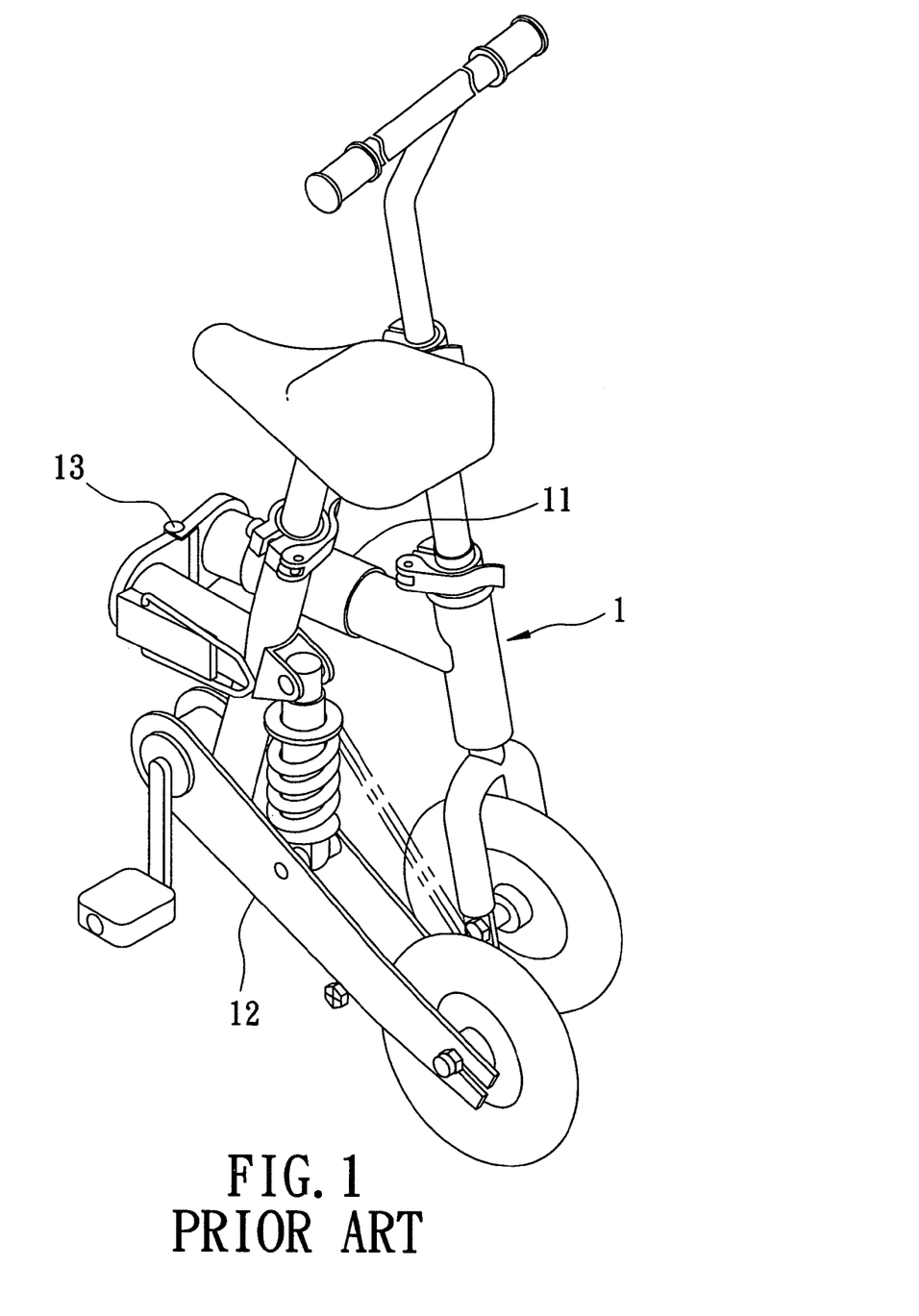
FIG. 1 is a perspective view of a conventional foldable bicycle, illustrating a folded state thereof.

Referring to FIG. 1, a conventional foldable bicycle 1 is shown to include front and rear frames 11, 12 that are interconnected rotatably by a vertical pivot pin 13. When it is desired to fold the bicycle 1, the front and rear frames 11, 12 are rotatable about the pivot pin 13 to abut against each other. The bicycle 1 is disadvantageous in that stress is focused on the pivot pin 13 during riding. As a result, the pivot pin 13 is apt to break.

SUMMARY OF THE INVENTION

The object of this invention is to provide a foldable bicycle that can prevent stress concentration on a pivot pin interconnecting front and rear frame rods.

According to this invention, a foldable bicycle has a frame unit and a positioning unit. The frame unit includes a front wheel unit disposed on a front frame rod, a rear wheel unit disposed on a rear frame rod and aligned with the front wheel unit along a longitudinal direction of the bicycle, and a horizontal pivot pin interconnecting the front and rear frame rods rotatably such that the pivot pin and rotating axes of the front and rear wheel units forming generally an isosceles triangle. The positioning unit positions the rear frame rod behind the front frame rod, and is operable to allow for rotation of the front and rear frame rods about the pivot pin so as to dispose the bicycle at a folded position, where the front and rear wheel units are aligned with each other along a transverse direction of the bicycle. Because the pivot pin is horizontal, stress concentration on the pivot pin can be prevented.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 2:
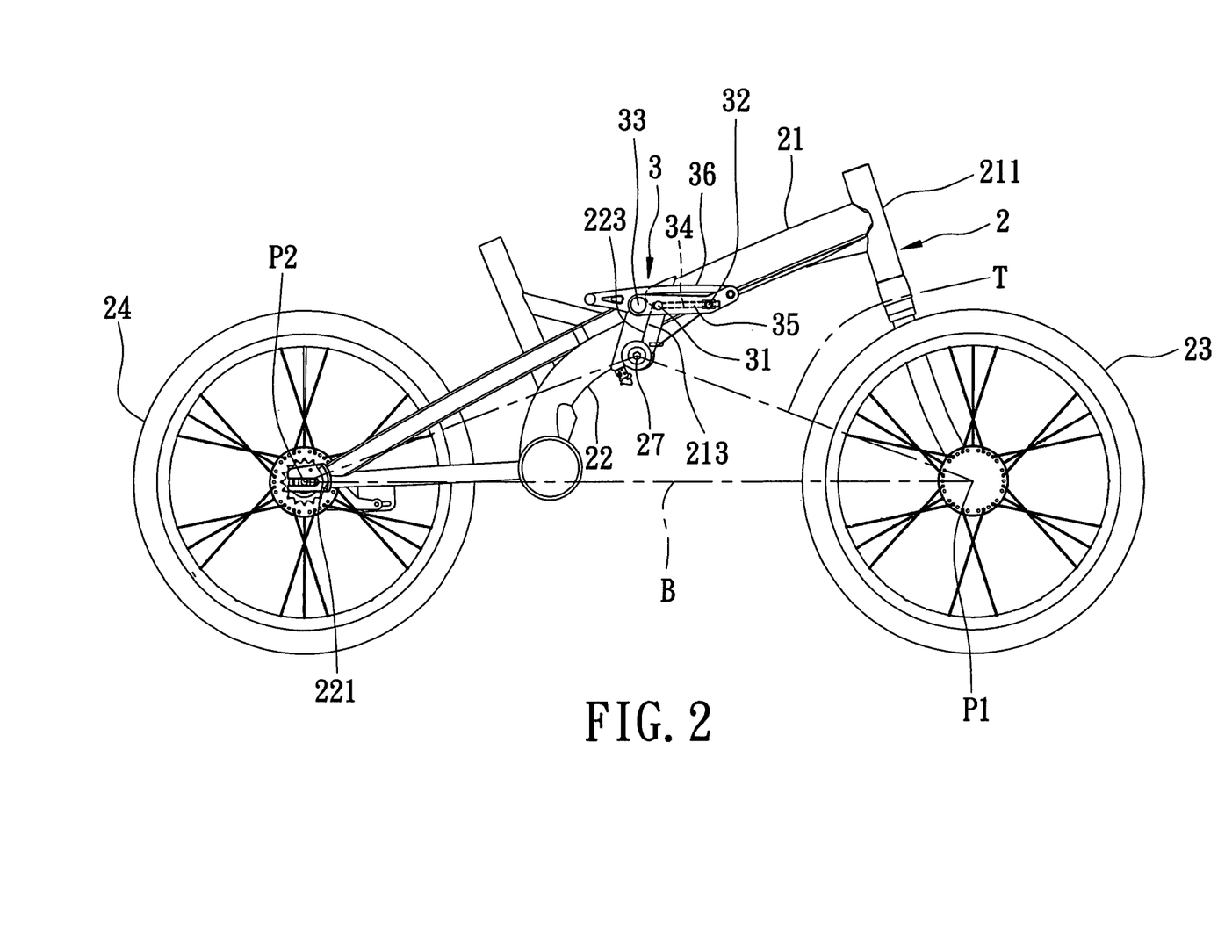
FIG. 2 is a schematic fragmentary side view of the first preferred embodiment of a foldable bicycle according to this invention.
Figure 3:
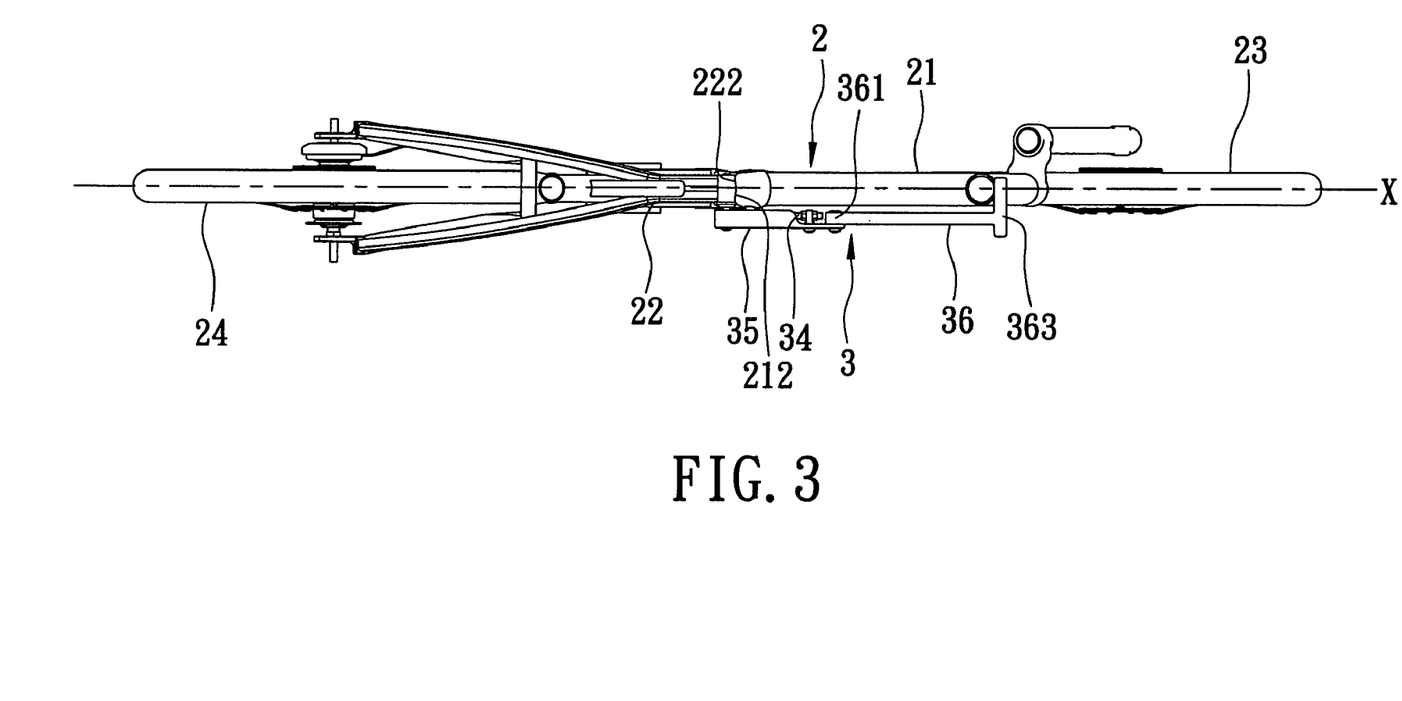
FIG. 3 is a fragmentary top view of the first preferred embodiment.
Figure 4:
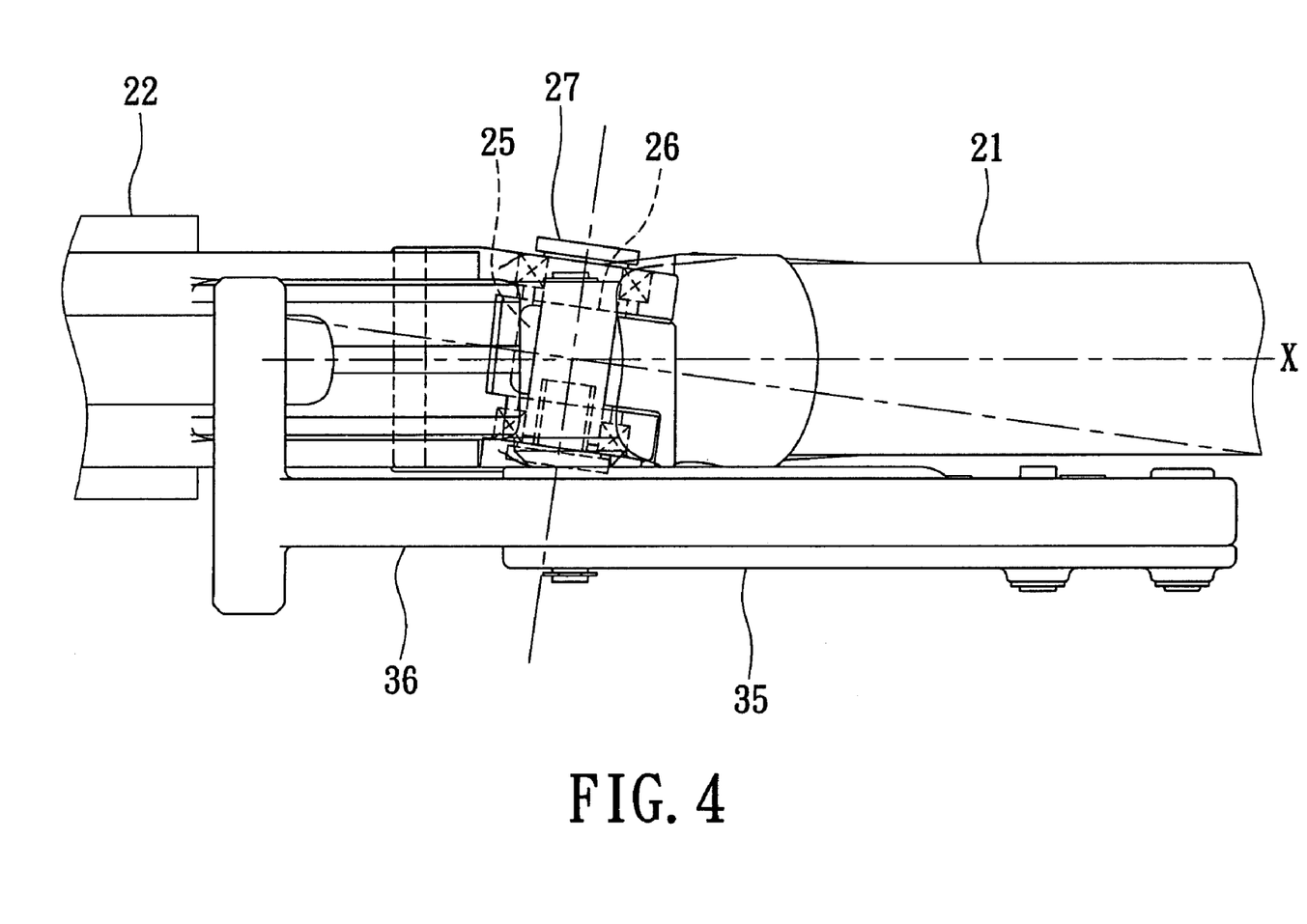
FIG. 4 is a schematic fragmentary top view of the first preferred embodiment, illustrating how a central axis of a horizontal pivot pin is inclined relative to front and rear frame rods.

Referring to FIGS. 2, 3, and 4, the first preferred embodiment of a foldable bicycle according to this invention is shown to include a frame unit 2 and a positioning unit 3.

Because the handle and seat of the bicycle are not pertinent to the scope of this invention, they are omitted from the drawings for the sake of brevity.

Figure 11:
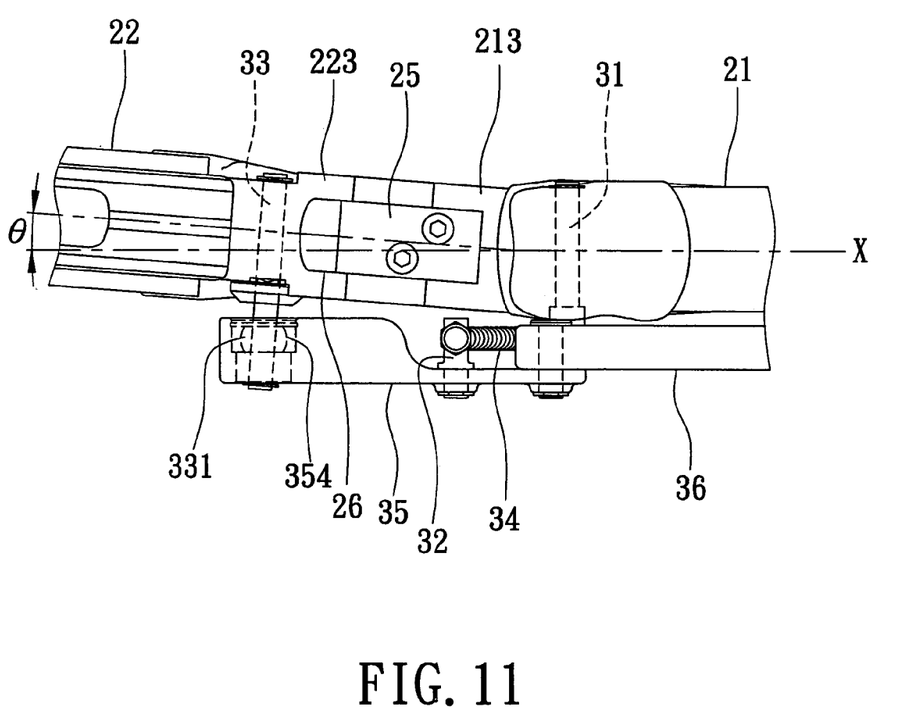
FIG. 11 is a fragmentary top view of the first preferred embodiment, illustrating how an angle is formed between the front and rear frame rods.

The frame unit 2 includes a front frame rod 21, a rear frame rod 22, a front wheel unit 23, a rear wheel unit 24, a tongue 25, a groove 26, and a horizontal pivot pin 27. The front and rear frame rods 21, 22 extend along an inclined axis (X), and are interconnected rotatably by the pivot pin 27. The front frame rod 21 has a front end 211, a rear end 212, and a rear end surface 213. The rear end surface 213 is disposed immediately above the pivot pin 27, and is inclined relative to the inclined axis (X). The rear frame rod 22 is disposed behind the front frame rod 21, and has a rear end 221, a front end 222, and a front end surface 223. The front end surface 223 is disposed immediately above the pivot pin 27, is inclined relative to the inclined axis (X), and abuts against the rear end surface 213 of the front frame rod 21. As such, the rear end surface 213 of the front frame rod 21 and the front end surface 223 of the rear frame rod 22 can only turn downwardly about the pivot pin 27 during folding of the bicycle. The front wheel unit 23 is disposed at the front end 211 of the front frame rod 21. The rear wheel unit 24 is disposed at the rear end 221 of the rear frame rod 22, and is aligned with the front wheel unit 23 along a longitudinal direction of the bicycle. The tongue 25 extends integrally from the rear end surface 213 of the front frame rod 21 into the groove 26. The groove 26 is formed in the front end surface 223 of the rear frame rod 22. The pivot pin 27 interconnects rotatably the rear end 212 of the front frame rod 21 and the front end 222 of the rear frame rod 22, and has a central axis (C) (see FIG. 4) that is inclined relative to the inclined axis (X). As such, the rear frame rod 22 can rotate about the pivot pin 27 so as to form an angle (θ) (see FIG. 11) between a central axis of the rear frame rod 22 and the inclined axis (X), thereby removing the rear wheel unit 24 from alignment with the front wheel unit 23 along the longitudinal direction of the bicycle. The pivot pin 27 and rotating axes (P1, P2) of the front and rear wheel units 23, 24 form generally an isosceles triangle (T). A line (B) interconnecting the rotating axes (P1, P2) of the front and rear wheel units 23, 24 constitutes the base of the isosceles triangle (T). In FIG. 2, although the pivot pin 27 should be a straight line but not be a point as shown, the length of the straight line is minimal with respect to the sides and base of the isosceles triangle (T), and thus is neglected.

Figure 5:
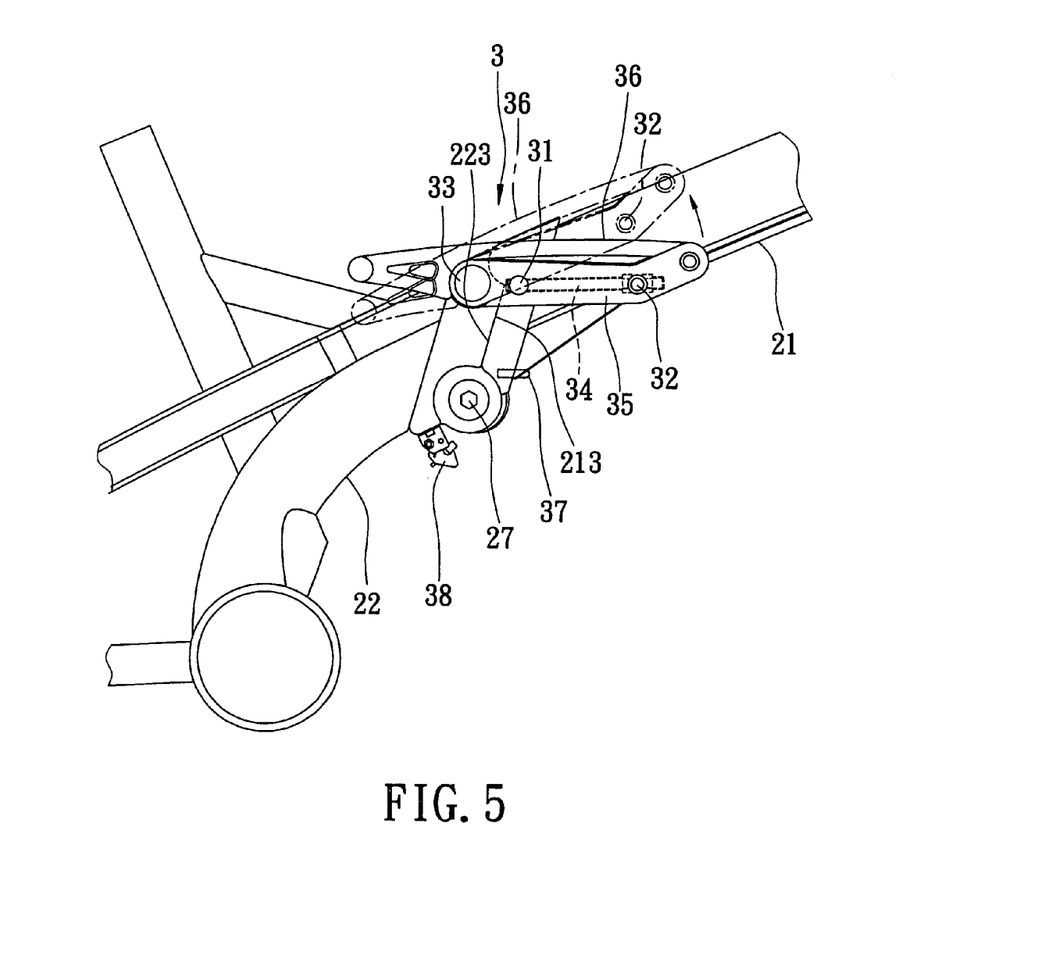
FIG. 5 is a schematic fragmentary side view of the first preferred embodiment, illustrating how the front and rear frame rods are locked against each other by a positioning unit.
Figure 6:
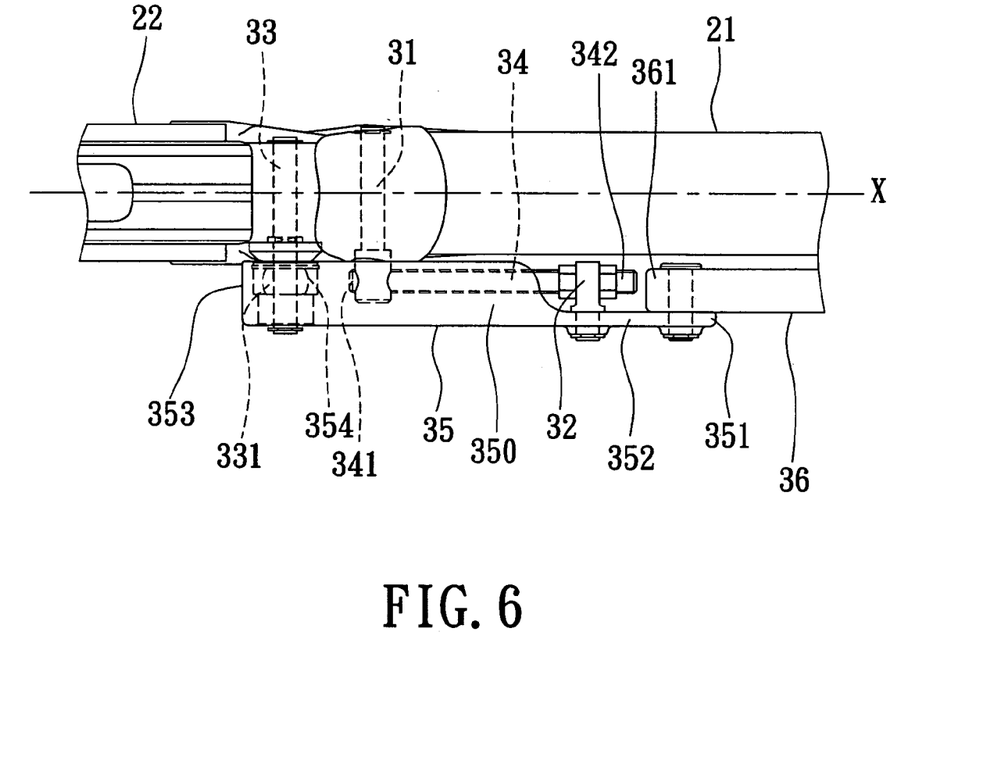
FIG. 6 is a fragmentary top view of the first preferred embodiment, illustrating how an operable pivot is disposed at a lower limit position, where the front and rear frame rods are locked against each other by the positioning unit.

Referring to FIGS. 2, 5 and 6, the positioning unit 3 positions the rear frame rod 22 behind the front frame rod 21, and includes a horizontal front pivot 31, a horizontal operable pivot 32, a horizontal rear pivot 33, a first link 34, a second link 35, a handle 36, a retaining ring 37, and a retaining hook 38.

The first link 34 is disposed above the pivot pin 27, and has a rear end 341 connected rotatably to the front frame rod 21 by the front pivot 31 at a position adjacent to the rear end surface 213 of the front frame rod 21, and a front end 342.

The second link 35 is disposed above the pivot pin 27, and has an integral top wall 350, a front distal end 351, a front end portion 352 disposed behind the front distal end 351 and connected rotatably to the front end 342 of the first link 34 by the operable pivot 32, and a rear end 353 that is formed with a ball socket 354.

The rear pivot 33 is disposed behind the front pivot 31, extends through the rear frame rod 22 at a position adjacent to the front end surface 223 of the rear frame rod 22, and has a generally spherical end 331 that is received fittingly and rotatably within the ball socket 354 of the second link 35 so as to connect the rear end 353 of the second link 35 to the rear frame rod 22.

Figure 7:
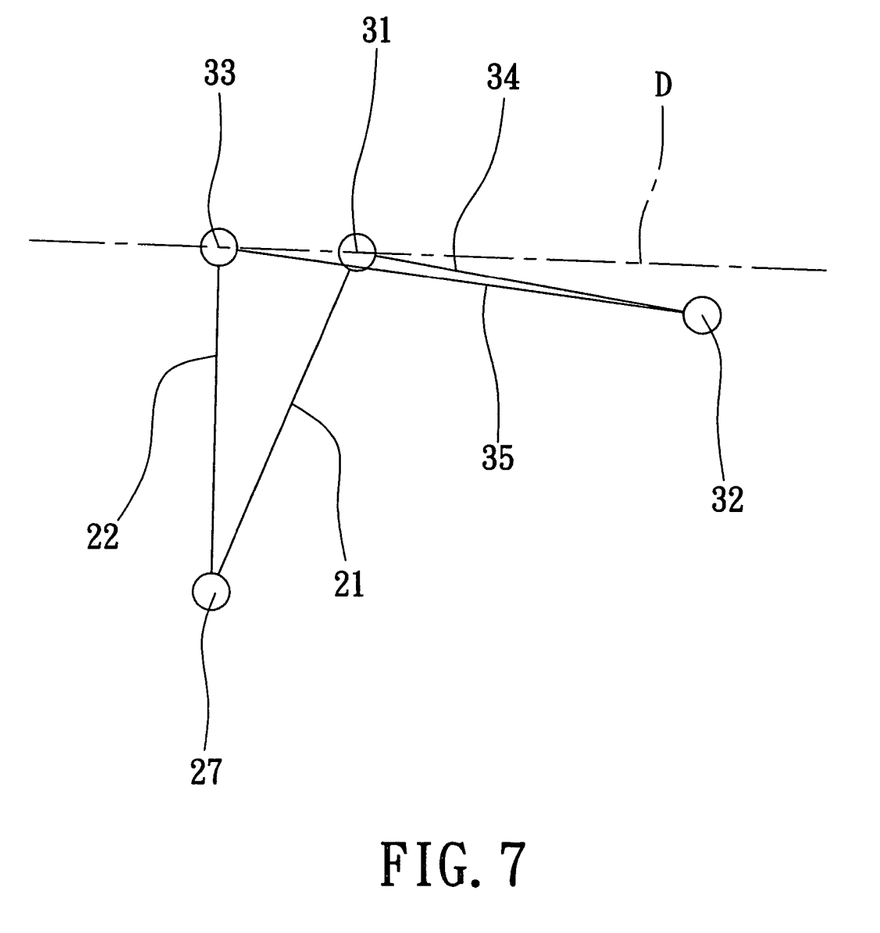
FIG. 7 is a schematic view of a four-bar linkage mechanism of the first preferred embodiment, illustrating how the operable pivot is disposed at the lower limit position.
Figure 8:
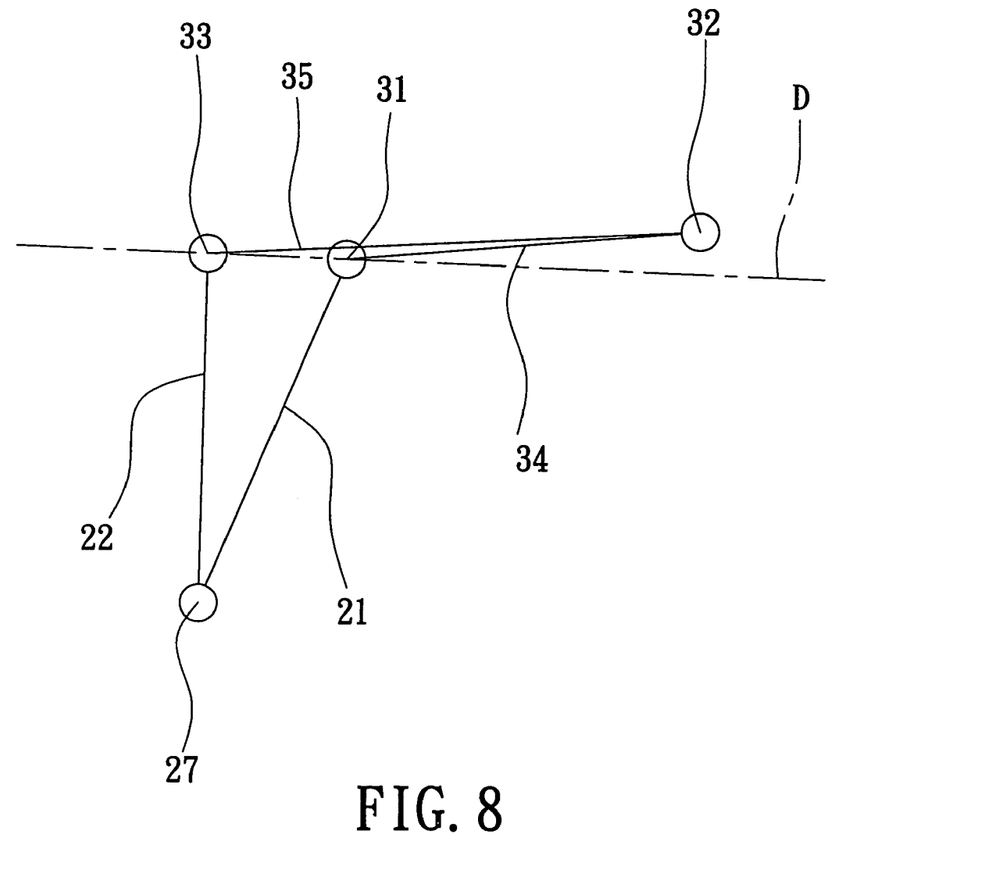
FIG. 8 is a schematic view of the four-bar linkage mechanism of the first preferred embodiment, illustrating the release position of the operable pivot.
Figure 9:
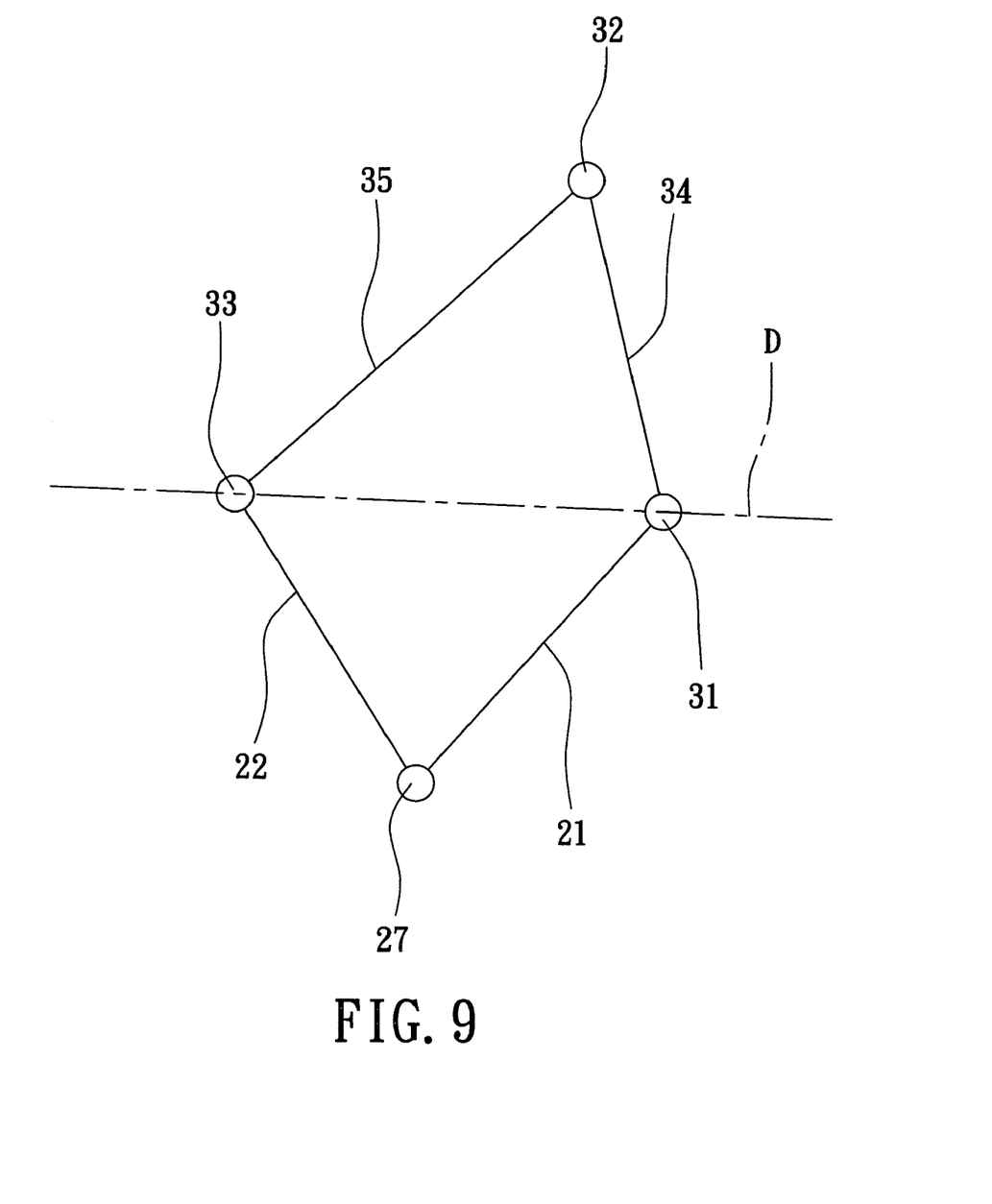
FIG. 9 is a schematic view of the four-bar linkage mechanism of the first preferred embodiment, illustrating an upper limit position of the operable pivot, where relative rotation between the front and rear frame rods is allowed.

The operable pivot 32 interconnects rotatably the front end 342 of the first link 34 and the front end portion 352 of the second link 35, and is movable relative to the front frame rod 21 between a lower limit position shown in FIGS. 6 and 7, where the operable pivot 32 is located below a straight line (D) (see FIGS. 7 and 9) extending through the front and rear pivots 31, 33 and where relative rotation between the front and rear frame rods 21, 22 is prevented, and an upper limit position shown in FIGS. 9 and 10, where the operable pivot 32 is located above the straight line (D) (see FIGS. 7 and 9) extending through the front and rear pivots 31, 33 and where the front and rear frame rods 21, 22 are rotatable about the pivot pin 27. When the operable pivot 32 is disposed at the lower limit position, the top plate 350 of the second link 35 is horizontal, and the first link 34 abuts against a bottom surface of the top plate 350 of the second link 35 so as to position the first and second links 34, 35 relative to each other. As a consequence, the first and second links 34, 35 and the front and rear frame rods 21, 22 constitute a four-bar linkage mechanism, as shown in FIGS. 7, 8, and 9.

Figure 10:
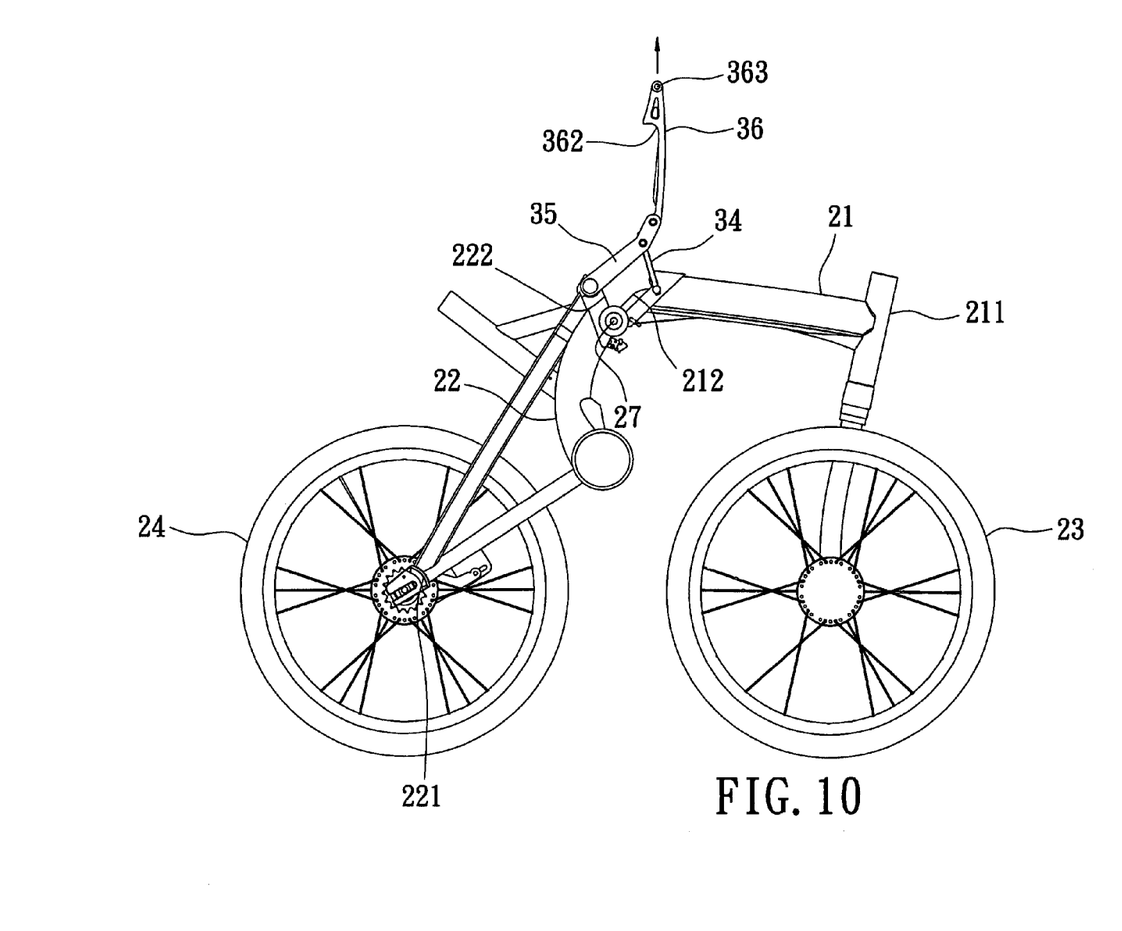
FIG. 10 is a fragmentary side view of the first preferred embodiment, illustrating how the operable pivot is moved to the upper limit position so that the bicycle is ready for folding.

The handle 36 has a pivot end 361 connected pivotally to the front distal end 351 of the second link 35, a hook portion 362 engaging the rear end 353 of the second link 35, and a free end that is formed with a fixed grip rod 363 (see FIGS. 3 and 10). The grip rod 363 is horizontal, and extends along a transverse direction of the bicycle.

The retaining ring 37 is attached to the front frame rod 21 at a position adjacent to the rear end surface 213 of the front frame rod 21.

The retaining hook 38 is connected fixedly to the rear frame rod 22 at a position adjacent to the front end surface 223 of the rear frame rod 22

Because the front end surface 223 of the rear frame rod 22 abuts against the rear end surface 213 of the front frame rod 21, the front and rear frame rods 21, 22 cannot turn upwardly about the pivot pin 27. Under this state, because the first link 34 abuts against the bottom surface of the top plate 350 of the second link 35, and because the operable pivot 32 is located below the straight line (D) (see FIGS. 7 and 9) extending through the front and rear pivots 31, 33, as shown in FIG. 7, the first and second links 34, 35 are fixed relative to the front and rear frame rods 21, 22. Therefore, the front and rear frame rods 21, 22 are locked against each other by the positioning unit 3, as shown in FIGS. 2, 5, and 6. The operable pivot 32 is movable forcibly to a release position shown in FIG. 8, which is located immediately above the straight line (D) (see FIGS. 7 and 9), in a direction shown by the arrowhead in FIG. 5. When the operable pivot 32 is disposed at the release position, the front and rear frame rods 21, 22 are released from each other.

When it is desired to fold the bicycle, the grip rod 363 of the handle 36 is removed from the rear end 353 of the second link 35, and is pulled upwardly so as to move the operable pivot 32 to the upper limit position shown in FIG. 9. Thereafter, due to the gravity of the front and rear wheel units 23, 24, further upward movement of the grip rod 363 will result in rotation of the front and rear frame rods 21, 22 toward each other about the pivot pin 27 and movement of the front and rear wheel units 23, 24 toward each other until the front and rear wheel units 23, 24 are aligned with each other along the transverse direction of the bicycle, as shown in FIGS. 12 and 13.

Figure 12:
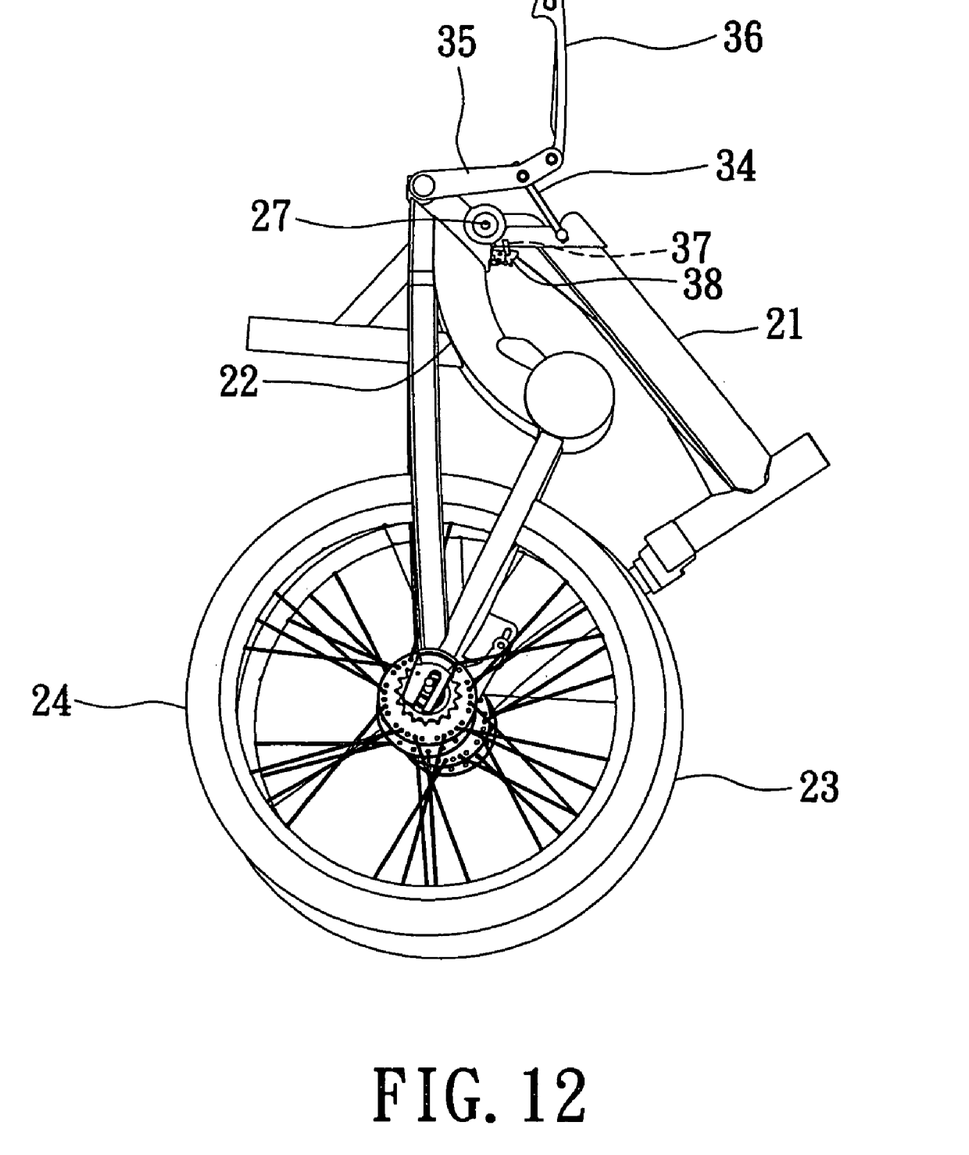
FIG. 12 is a fragmentary side view of the first preferred embodiment, illustrating the folded position of the bicycle.
Figure 13:
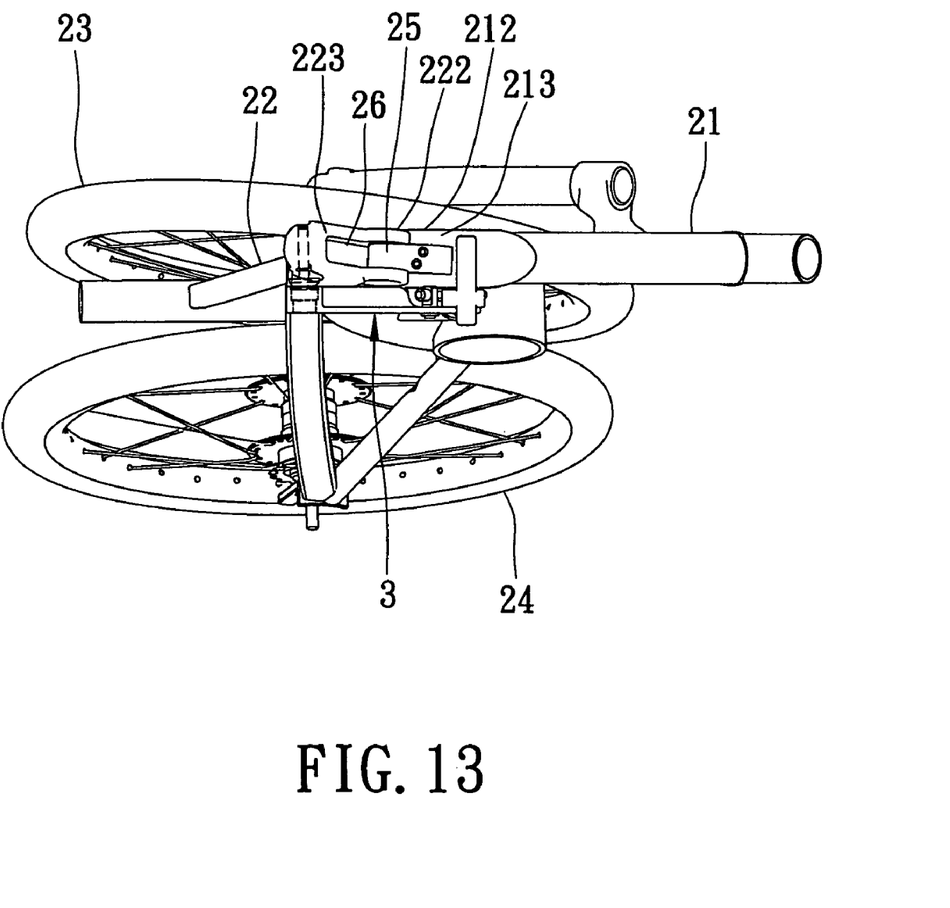
FIG. 13 is a fragmentary perspective view of the first preferred embodiment, illustrating the folded position of the bicycle.

Subsequently, the retaining hook 38 is moved to engage the retaining ring 37 so as to prevent relative rotation between the front and rear frame rods 21, 22, as shown in FIG. 12.

Figure 14:
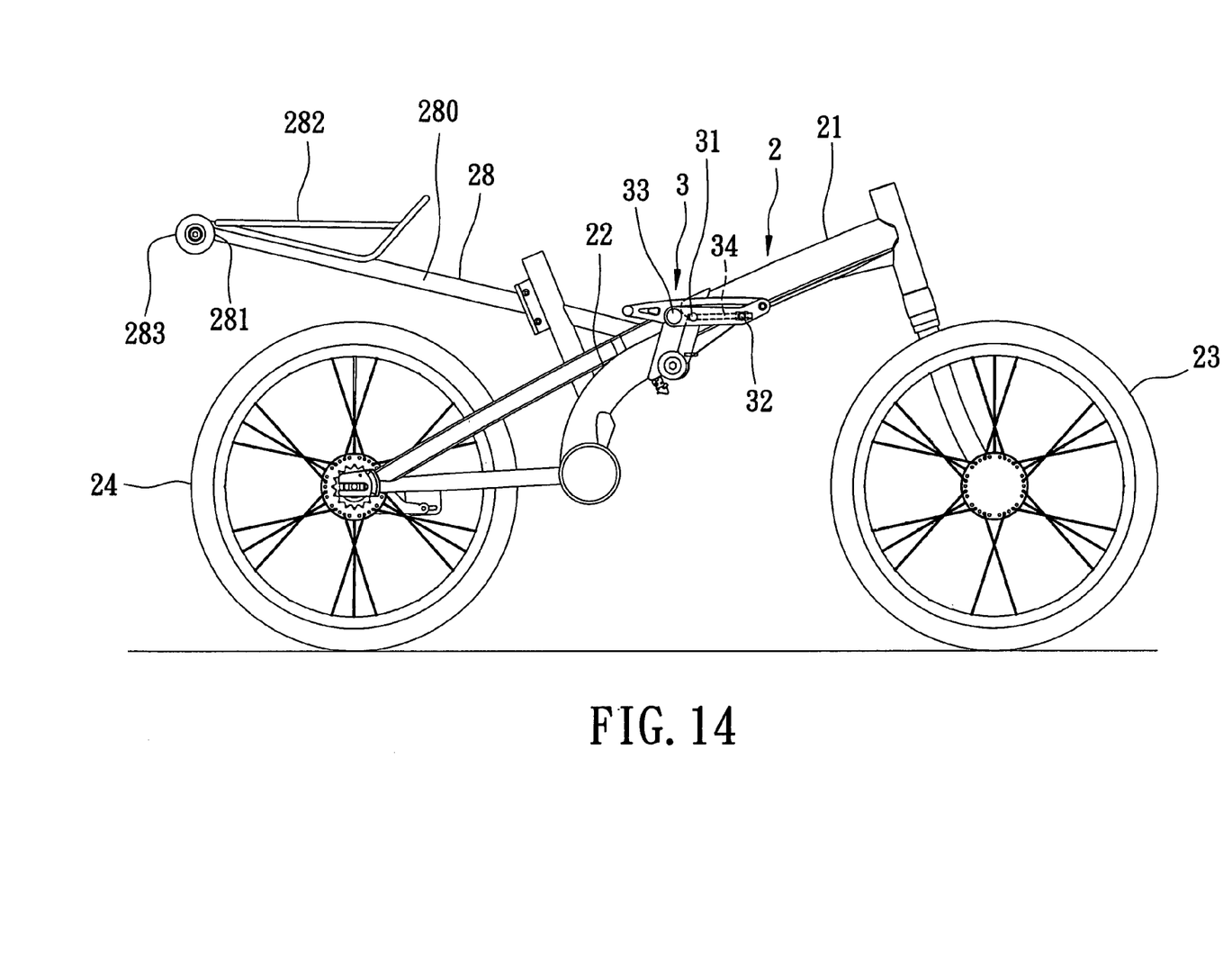
FIG. 14 is a fragmentary side view of the second preferred embodiment of a foldable bicycle according to this invention.
Figure 15:
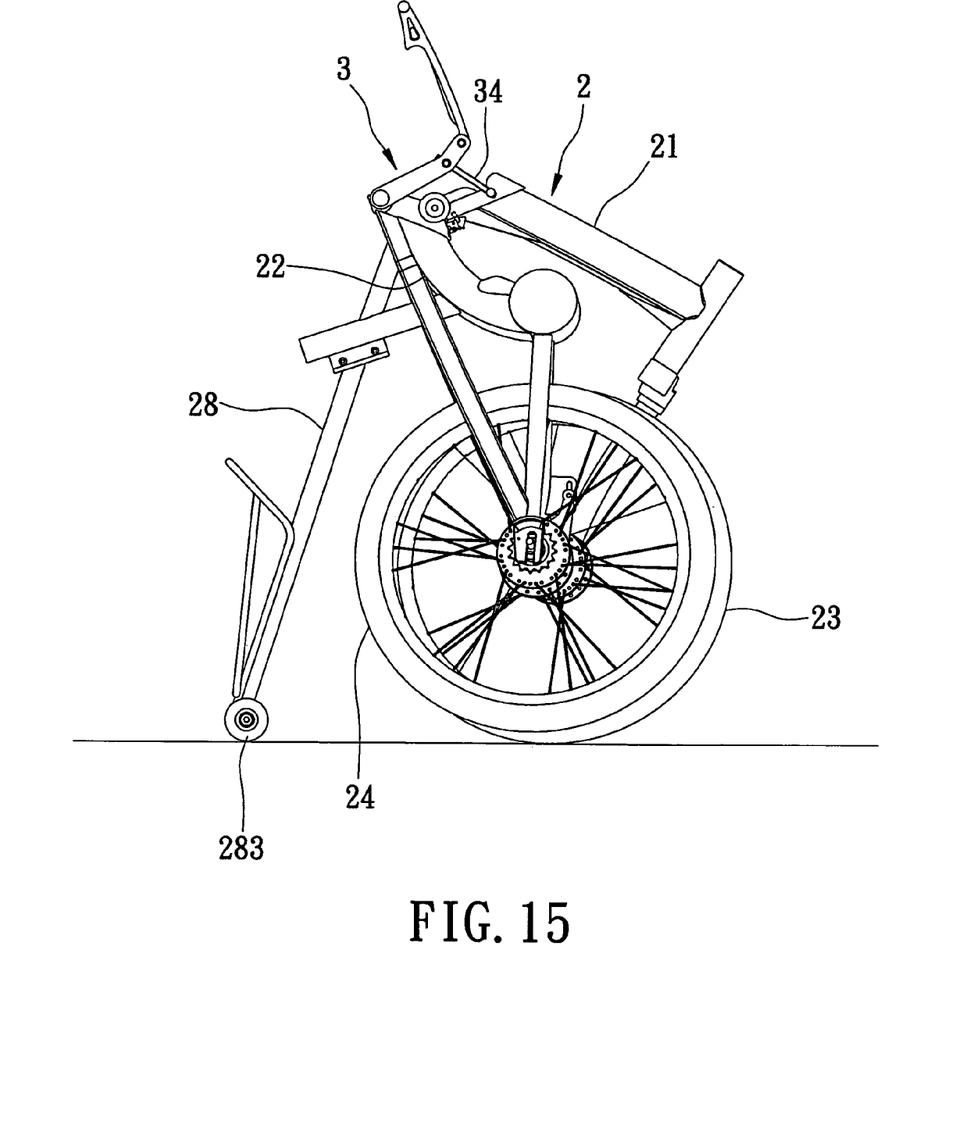
FIG. 15 is a fragmentary side view of the second preferred embodiment, illustrating the folded position of the bicycle.

FIG. 14 shows the second preferred embodiment of a foldable bicycle according to this invention, which is similar to the previous embodiment in construction except that this embodiment further includes a luggage rack unit 28. The rack unit 28 includes a support rod 280 extending rearwardly from the rear frame rod 22 and having a rear end 281 that is provided with a rack body 282 and a plurality of rollers 283 (only one is shown), which are rotatable on a flat surface with the front and rear wheel units 23, 24 when the bicycle is disposed at the folded position, as shown in FIG. 15. As such, the folded bicycle can be easily moved.

The foldable bicycle of this invention has the following advantages:

(1) Because the pivot pin 27 is horizontal, stress concentration thereon can be prevented.
(2) The bicycle can be folded easily and conveniently by pulling the grip rod 363 upwardly.

With this invention thus explained, it is apparent that numerous modifications and variations can be made without departing from the scope and spirit of this invention. It is therefore intended that this invention be limited only as indicated by the appended claims.

I claim:

1. A foldable bicycle comprising:
    a frame unit including a front frame rod, a rear frame rod disposed behind said front frame rod, a front wheel unit disposed at a front end of said front frame rod, a rear wheel unit disposed at a rear end of said rear frame rod and aligned with said front wheel unit along a longitudinal direction of said bicycle, and a horizontal pivot pin interconnecting rotatably a rear end of said front frame rod and a front end of said rear frame rod such that said pivot pin and rotating axes of said front and rear wheel units forming generally an isosceles triangle, said front and rear frame rods extend along an inclined axis, said front frame rod having a rear end surface that is disposed above said pivot pin and that is inclined relative to said inclined axis, said rear frame rod having a front end surface formed with a groove that is disposed above said pivot pin, that is inclined relative to said inclined axis, and that abuts against said rear end surface of said front frame rod, said rear end surface of said front frame rod being formed with an integral tongue that extends into said groove in said front end surface of said rear frame rod, said pivot pin extending through said front end of said rear frame rod and said tongue of said front frame rod and having a central axis that is inclined relative to said inclined axis so as to allow for alignment of said front and rear wheel units along said transverse direction of said bicycle when said bicycle is folded, a line interconnecting said rotating axes of said front and rear wheel units constituting a base of said isosceles triangle; and a positioning unit positioning said rear frame rod behind said front frame rod and operable to allow for rotation of said front and rear frame rods about said pivot pin so as to dispose said bicycle at a folded position, where said front and rear wheel units are aligned with each other along a transverse direction of said bicycle said positioning unit being operable to turn said rear end surface of said front frame rod and said front end surface of said rear frame rod downwardly so as to fold said bicycle.

2. The foldable bicycle as claimed in claim 1, wherein said positioning unit includes:

a first link disposed above said pivot pin and having a front end and a rear end;

a horizontal front pivot connecting said rear end of said first link rotatably to said front frame rod at a position adjacent to said rear end surface of said front frame rod;

a second link disposed above said pivot pin and having a front end portion and a rear end;

a horizontal rear pivot disposed behind said front pivot and connecting said rear end of said second link rotatably to said rear frame rod at a position adjacent to said front end surface of said rear frame rod;

a horizontal operable pivot interconnecting rotatably said front end of said first link and said front end portion of said second link and movable relative to said front frame rod between a lower limit position, where said operable pivot is located below a straight line extending through said front and rear pivots and where relative rotation between said front and rear frame rods is prevented, and an upper limit position, where said operable pivot is located above the straight line extending through said front and rear pivots and where said front and rear frame rods are rotatable about said pivot pin.

3. The foldable bicycle as claimed in claim 2, wherein said rear end of said second link is formed with a ball socket, said rear pivot having a generally spherical end that is received fittingly and rotatably within said ball socket of said second link.

4. The foldable bicycle as claimed in claim 2, wherein said second link further has a front distal end disposed in front of said front end portion of said second link, said positioning unit further including a handle, said handle having a pivot end connected pivotally to said front distal end of said second link, a hook portion engaging said rear end of said second link, and a free end that is formed with a fixed grip rod, which can be pulled upwardly so as to move said operable pivot to said upper limit position.

5. The foldable bicycle as claimed in claim 2, wherein said second link has an integral top plate, said first link abutting against a bottom surface of said top plate of said second link so as to position said first and second links relative to each other when said operable pivot is disposed at said lower limit position.

6. The foldable bicycle as claimed in claim 1, wherein said frame unit further includes a luggage rack unit, said luggage rack unit including a support rod that extends rearwardly from the rear frame rod and that has a rear end which is provided with a rack body and a plurality of rollers, said rollers being adapted to be rotatable on a flat surface with said front and rear wheel units when said bicycle is disposed at said folded position.

7. The foldable bicycle as claimed in claim 1, wherein said positioning unit includes:

a retaining ring attached to said front frame rod at a position adjacent to said rear end surface of said front frame rod; and a retaining hook connected fixedly to said rear frame rod at a position adjacent to said front end surface of said rear frame rod and engaging said retaining ring so as to prevent relative rotation between said front and rear frame rods when said bicycle is disposed at said folded position.

* * * * *